No. 620,732. Patented Mar. 7, 1899.
D. BEST.
HARVESTER GUARD FINGER BAR.
(Application filed Apr. 21, 1898.)

(No Model.)

Witnesses,
Inventor,
Daniel Best,
By Dewey Strong & Co.
Attys.

THE NORRIS PETERS CO., PHOTO-LITHO., WASHINGTON, D. C.

UNITED STATES PATENT OFFICE.

DANIEL BEST, OF SAN LEANDRO, CALIFORNIA.

HARVESTER-GUARD FINGER-BAR.

SPECIFICATION forming part of Letters Patent No. 620,732, dated March 7, 1899.

Application filed April 21, 1898. Serial No. 678,321. (No model.)

*To all whom it may concern:*

Be it known that I, DANIEL BEST, a citizen of the United States, residing at San Leandro, county of Alameda, State of California, have invented an Improvement in Harvester-Guard Finger-Bars; and I hereby declare the following to be a full, clear, and exact description of the same.

My invention relates to an improvement in harvester-guard and finger-bar attachments for that class of machines in which a horizontally-reciprocating sickle is used; and it consists, essentially, in details of construction, which will be more fully explained by reference to the accompanying drawings, in which—

Figure 1:
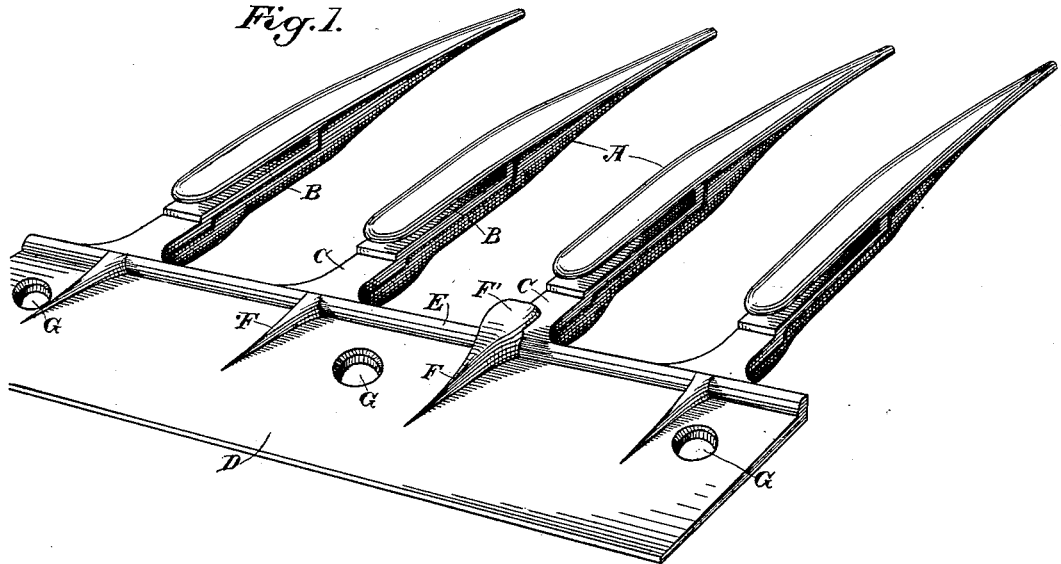
Figure 2:
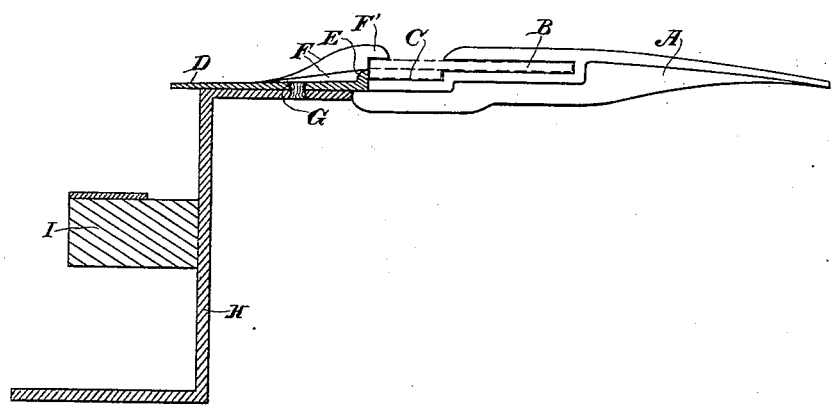

Figure 1 is a view of one of the sections of my improved guard. Fig. 2 shows the application and attachment to the front bar of the machine.

In the construction of harvesters, mowing-machines, and similar devices for cutting hay or grain it is customary to employ a reciprocating sickle which moves within guards or fingers, so that the shearing motion produced by the blades passing through these fingers will cut the grain. These fingers or guards have been made in various ways and variously attached to the front bar of the header or machine which carries them.

The object of my present invention is to provide for the making of the guards and fingers in independent sets or sections and in so constructing the guard as to prevent a loss of grain over the front thereof when the machine is depressed at an angle to cut low grain.

I have found in practice that in the majority of harvesters the construction is such that there is a great loss of grain, which passes forward after having been cut and slides over the front upon the ground, where it is lost. My invention is especially designed to prevent this loss, and also comprises the improvements in construction and attachment of the guard.

In the construction of my improved guard I cast the fingers A with the slot or channel B, into which the cutting-sections project. At the rear of these slots or channels a depression is made, as shown at C, in which the cutter-bar lies and within which it is reciprocated by any well-known or suitable means. The cutter-sections are riveted to this bar, and the bar is just thick enough to fill the channel C, so that the sections project into the channels B. The rear portion of two or more of the fingers is cast upon and with a plate D, which projects horizontally and rearwardly from the fingers, and this plate has along the front edge, between it and the channel C, in which the cutter-bar reciprocates, a raised rib or ledge E. From this rib or ledge across the flat surface of the plate D extend the tapering ribs F, which lie in line directly behind the fingers A, and one of these ribs in each section has a projecting lip F', which extends forward over the groove or channel C, in which the cutter-bar reciprocates, and essentially in line with the upper part of the finger which forms the channel B for the cutting-section, so that the cutter-bar is retained in its place in the channel C by these projecting portions F'. Through the plate D holes G are made at suitable intervals to receive bolts or rivets by which the plate is secured to the front of the bar H. This bar is rolled and made of either angle or Z iron. As shown in the present case, it has two horizontal flanges and the upper horizontal portion is perforated to receive bolts or rivets which pass through the holes G in the plates D, so that the latter are riveted firmly to the top of the angle-iron plate, and thus held in position.

The rear edge of the plate D projects a short distance behind the vertical portion of the plate H, and thus forms a guide-strip above the edge of the carrier-belt, the upper portion of which runs between this projecting plate and the bar I, which is secured to the bar H at a point sufficiently below the plate D for this purpose.

I have here shown my guards or fingers as formed in groups of four, which are cast integral with the rearwardly-projecting plate D, having the raised rib E along its front, as previously described. It is thus convenient to remove these sections at any time if they become broken and replace them with new without being obliged to take off the whole length.

Having thus described my invention, what

I claim as new, and desire to secure by Letters Patent, is—

1. In a harvester and in combination with the bar or support at the front of the machine, a plate secured to the upper surface of the bar and having integral fingers projecting horizontally in the plane of and from the front edge of said plate, said fingers provided with grooves or channels for the cutter-sections and cutter-bar, and said plate having an upwardly-projecting rib along said front edge with a lip projecting forward of the rib at the front edge of the plate so as to overhang the cutter-bar.

2. In a harvester, a guard of the character described, consisting of plates having parallel front and rear edges said front edge provided with a raised rib made rigid with forwardly-projecting fingers having grooves or channels for the guidance of the cutter bar and sections, and the upper surface of the plate made integral with rearwardly-extending tapering ribs, disposed in line with the fingers and with one of the ribs of each series having a lip which projects forward of the rib along the front edge of the plate and overhangs the groove or channel of the cutter-bar whereby the said bar is retained in place.

3. In a harvester, the combination with the angle-iron bar forming the front of the harvester, of the sectional plates D fitting the upper horizontal member of the said bar and having substantially parallel front and rear edges, the rear edge projecting beyond the plane of the vertical portion of said bar and the said front edge having an integral rib and forwardly-extending fingers rigid therewith and in the horizontal plane of the plates D, the top surface of the plates made integral with tapering lugs which project back from the ribs at the front edges and one of said lugs of each series projecting forward and overhanging said rib to retain the cutter-bar in place on the fingers, and means for securing each plate to the angle-iron bar at a plurality of points.

In testimony whereof I have hereunto set my hand.

DANIEL BEST.

Witnesses:
 S. HUFF,
 CHAS. H. HALE.